United States Patent [19]
Felix

[11] Patent Number: 5,395,071
[45] Date of Patent: Mar. 7, 1995

[54] AIRFOIL WITH BICAMBERED SURFACE

[76] Inventor: Frederick L. Felix, W10508 Bell Rd., Camp Douglas, Wis. 54618

[21] Appl. No.: 119,353

[22] Filed: Sep. 9, 1993

[51] Int. Cl.⁶ .............................................. B64C 3/14
[52] U.S. Cl. .................................... 244/35 R; 244/200
[58] Field of Search ................... 244/198, 200, 35 R

[56] References Cited

U.S. PATENT DOCUMENTS

| | | | |
|---|---|---|---|
| 934,771 | 9/1909 | Turnbull | 244/35 R |
| 1,180,271 | 4/1916 | Tarbox | 244/200 |
| 1,480,327 | 1/1924 | Wisenant | 244/35 R |
| 1,870,514 | 8/1932 | Kontos | 244/200 |
| 3,298,636 | 1/1967 | Arnholdt | 244/198 |
| 4,434,957 | 3/1984 | Moritz | 244/200 |
| 4,776,531 | 10/1988 | Noonan | 244/35 R |

FOREIGN PATENT DOCUMENTS

| | | | |
|---|---|---|---|
| 604495 | 5/1926 | France | 244/35 R |
| 40/4015195 | 1/1992 | Japan | 244/200 |

*Primary Examiner*—Galen L. Barefoot

[57] ABSTRACT

An improved airfoil using bicambered surfaces to promote laminar flow, attached flow, reattachment of flow, delayed flow separation and to achieve high angle-of-attack performance. Bicambered surfaces introduce alternating favorable and adverse pressure gradients to achieve enhanced flow control.

8 Claims, 13 Drawing Sheets

AIRFOIL WITH BICAMBERED SURFACE

BACKGROUND OF THE INVENTION

This invention relates to airfoils used for lift, down pressure, stability, control or propulsion of; aircraft, watercraft and other vehicles, fans, turbines, wind generators and other devices that act in and upon fluids, and more particularly to wings (both stationary and rotating), tailplanes, canards, rudders, propellers, rotors, vanes, and impellers.

Inasmuch as this invention is equally applicable to hydrofoils, the term "airfoil" is herein construed to include both airfoils and hydrofoils.

To the present time known airfoils have been designed with a single maximum profile thickness, the object being to retain a smooth streamlined profile. Single maximum thickness dictates that prior art airfoil's chordwise surface profile be single cambered; although single reflexed cambered surfaces with one, two or more convex or concave curves may be used. Prior art teaches that, concave sections and raised protrusions are to be avoided because it is generally believed such features create drag and reduce aerodynamic performance.

Various minor profile protrusions or indentations have been used to aid airfoil performance by inducing early transition or by introducing local separation to energize the boundary layer to delay separation. However, these features are of small size compared to the overall profile of the airfoil and do not alter their general character of a single camber and a single maximum thickness area enclosed by areas of decreasing thickness toward both leading and trailing edges.

In the past century extensive research with single cambered surface airfoils has provided numerous airfoil designs that optimize aerodynamic performance under given conditions. It is generally accepted within the art that enhancement of one aerodynamic quality is possible by trade-off of other aerodynamic qualities. For instance; reduced drag can be achieved while stall performance is sacrificed, higher lift is possible, but usually at the expense of increased drag, stall performance can be improved, but lift or drag performance suffers, overall performance can be improved at some angles-of-attack or at some Reynolds number while accepting reduced performance at others.

An antecedent for the present invention is high aerodynamic performance possible in flight of animals; particularly high attack angles in insect flight.

Some insects can fly at angles of attack up to and beyond 50° (Weis-Fogh, 1973). Further proof of this capability was obtained with insect wings in steady flow (Vogel, 1966). Thin plates with wing shapes stalled at angles of 20°, whereas wings did not stall until 50°. Vogel concludes that different dynamic properties of insect wings versus thin plates is due to their morphology. The thin plates lacked four distinguishing features of actual wings. Wings had veins and pleating of the wing membrane, they had rows of hairs on the trailing edge, bristles on the leading edge and microtrichia covering the wing surface.

The inventor believes most of the superior angle-of-attack capabilities of insect wings is due to the veins and pleating which act to reduce boundary layer thickness and delay separation.

Insect wing high stall angle is associated with high-drag coefficient, low-lift coefficient penalties. Insect wings operate at low Reynolds number with relatively large separated flow areas between the veins and pleats forming their surfaces.

The subject invention improves performance by combining high angle-of-attack stall performance with high-lift, low-drag performance. The means by which this is accomplished will become evident from the following explanation and specification with reference to the accompanying drawing figures.

SUMMARY OF THE INVENTION

The invention provides a stable, high-efficiency, high angle-of-attack, airfoil. The means for accomplishing these improvements is a novel, bicambered surface profile with two or more raised ridges placed laterally to fluid flow and generally running parallel to the leading and trailing edges. Raised ridges provide alternating favorable and adverse pressure gradients to recharacterize and redirect flow, maximizing the presence of attached boundary layer flow and minimizing separated wake flow.

Raised ridges differ in function from prior art vortex generators or so called large eddy breakup devices (LEBU's), of wave element crest, trough, or ramped design. LEBU's promote transition to turbulent flow or they induce early, mild trailing vortices intended to forestall more severe trailing separation downstream of the LEBU. In contrast, raised ridges are configured to promote attached flow and to avoid generating trailing vortices over the airfoil surface.

A primary objective of the invention is to improve efficiency of airfoils to obtain a higher ratio of useful work output to energy input, thereby saving significant energy resources. This is achieved because bicambered surface airfoils produce greater lift and reduced drag at normal operating angles of attack. Therefore they can sustain a higher airfoil loading as well as greater forward velocity with the same energy input in normal operation.

Other benefits of increased lift coefficients are possible by reduction of required lift surface. Smaller lift surfaces save structural weight, reduce profile drag, or allow reduction of induced drag by using higher aspect ratio airfoils.

A bicambered surface airfoils' improved ability to retain an attached boundary layer allows a lower thickness to chord profile to give performance comparable to thicker, single cambered surface airfoils.

The above capabilities provide extensive possibilities in design of high altitude aircraft where lift coefficients are low due to thin air. Improved lift coefficient reduces cost of constructing very large, light-weight lifting surfaces which can thereby be made smaller. Using thinner, shorter chord, shorter span wings on supersonic aircraft can reduce transonic shock on control surfaces and reduce sonic boom intensity. Transonic performance is improved by a thinner section reducing the optimum critical Mach number and increasing the drag divergence Mach number. Further improvement is realized by providing two locations at which the local Mach number becomes sonic; these being configured and arranged so that occurance of sonic condition on each is at different critical Mach numbers.

Another primary objective satisfied by the invention is an airfoil that is inherently stable at all angles of attack, delays onset of stall to angles in excess of 25%, and provides gradual loss of lift as stall develops. These traits are of substantial benefit in redirecting fluid flow for numerous fluid dynamic applications. For example; flow around bends in pipes, cascade flow as in turbines and impellers, and propellers at high-airfoil/slow-vehicle velocities, where attack angle is high.

For helicopter high vehicle velocities, where high maneuverability is desired, different lift and stall properties from one side of the aircraft to the other cause problems. The anti-stall characteristics of the bicambered surface airfoil can prevent much of these problems and greatly enhance the maneuverability of rotary wing vehicles.

This stable, high angle-of-attack airfoil is invaluable for improving private aviation safety. It is estimated that one fourth of private aircraft accidents involve wing stall. Higher attack angles combined with higher lift/drag ratios would enhance glide capabilities and prevent many private aircraft accidents.

Retaining attached flow further back on the airfoil means that more lift is experienced toward the airfoil trailing edge. By delaying trailing edge separation, bicambered surface airfoils provide greater stability via an aerodynamic center located closer to mid-chord point than prior art airfoils, and by an aerodynamic center that remains relatively fixed, and in some configurations, actually moves downstream as attack angle increases.

A secondary objective of the invention is to reduce mechanical force input required on variable pitch airfoils such as rotary wings, propellers, rotors and impellers, saving weight in the construction of these devices and ultimately enhancing output with less energy input being required by machines using these devices. The more central aerodynamic center and low or negative pitching moment of bicambered surface airfoils allows this objective to be fulfilled.

All of the improved aerodynamic qualities enumerated above are possible because the novel shape of bicambered surface airfoils control fluid flow to: a) reduce boundary layer thickness, b) recharacterize boundary layer flow, c) redirect flow, and d) reduce length of adverse pressure gradients.

Boundary layer thickness varies directly with the radius of a cylinder over which fluid flows. A well known principle in fluid dynamics is that flow over a smaller radius cylinder requires higher velocity to produce similitute with flow over a higher radius cylinder. Application of this principle to raised ridges illustrates that boundary layer over the short radius of a raised ridge will be thinner than boundary layer over a flat surface, as well as over the longer radius surface of single cambered surface airfoils. Just as a smaller cylinder reduces the Reynolds number, shorter radius raised ridge surfaces act to reduce the effective Reynolds number.

A thinner boundary layer reduces drag because the mass of fluid pulled along with the airfoil is substantially reduced. A discussion of this possibility regarding a slowing of insect wing beat frequencies with higher air density is found in Vogel, (1962).

Boundary layer flow is redirected by reattachment behind the initial upstream raised ridge enabling flow to withstand a steeper adverse pressure gradient downstream of reattachment than would otherwise be possible had the flow been subjected to a continuously increasing adverse pressure gradient.

Raised ridges recharacterize flow to maximize total area of laminar flow and minimize total area of separated wake flow. Favorable pressure gradients aid flow reattachment as well as stabilize and relaminarize flow on the upstream slope of each downstream ridge, acting to reduce the effective local Reynolds number.

Alternative arrangement of areas of greater thickness, orientation of slope angles, and design of relative major thicknesses provide great versatility in optimizing aerodynamic qualities of lift, stall angles-of-attack, placement of aerodynamic center, and drag.

High-lift advantages are obtained at both positive and negative angles of attack by incorporating bicambered surfaces on both upper and lower sides of the airfoil. At positive angles, the lower surface acts to increase dynamic pressure by cupping the fluid while flow on the upper surface fills in the upper concave portion with a thicker, attached boundary layer or separation bubble. The reverse situation occurs at negative attack angles to maximize downward lift.

Transition

Transition from laminar to turbulent flow is a well known principle of fluid dynamics. At very low Reynolds number, flow around an object is completely laminar. As velocity increases, laminar separation occurs on the widest parts of the object. Further velocity increases cause the point where turbulent flow first begins (critical Reynolds number is reached) to move forward until it reaches a point upstream of laminar separation. The now turbulent boundary layer is able to drive farther against the adverse pressure gradient of rear-facing slopes, thereby moving the flow separation point back on the object.

For bicambered surface airfoils, velocity at which critical Reynolds number is reached and at which turbulent flow occurs is generally higher than for prior art airfoils. In essence, characteristic flow development repeats on each raised ridge. Shorter length of each raised ridge versus a comparable length, single raised ridge airfoil yields a lower local Reynolds number equivalent.

For comparable chord length bicambered surface airfoils have shorter radius surface curves than prior art airfoils.

Flow over a short radius object must be at a greater velocity than flow over a long radius object to produce similitude in flow. Therefore bicambered surface airfoils effectively lower local Reynolds number in respect to boundary layer development. Benefits are a thinner boundary layer, later transition and later separation at any given velocity.

Reynolds number for airfoils is usually calculated using chord length which does not take into consideration factors such as roughness, curvature, vibration, etc. which can affect boundary layer flow. Curvature of streamlined bodies tends to delay separation, increase laminar flow, and increase attached flow. Just as single cambered curvature improves flow compared to flow across a flat surface, multiple curvature improves flow compared to flow across single cambered surfaces.

Separation of turbulent flow over a streamlined object occurs only in the presence of adverse pressure gradients. Likelihood of separation occurring increases with length and steepness of adverse pressure gradients. The unique geometric features of bicambered surface airfoils reduce length of adverse pressure gradients. Keeping adverse pressure gradients short allows attached flow to sustain a steeper gradient. In addition, being farther back on the chord line, the final adverse pressure gradient of bicambered surface airfoils places separation farther back.

Additional objects and advantages of the invention will become apparent from the specification and drawings referenced therein.

DETAILED DESCRIPTION OF THE INVENTION

Figure 1:
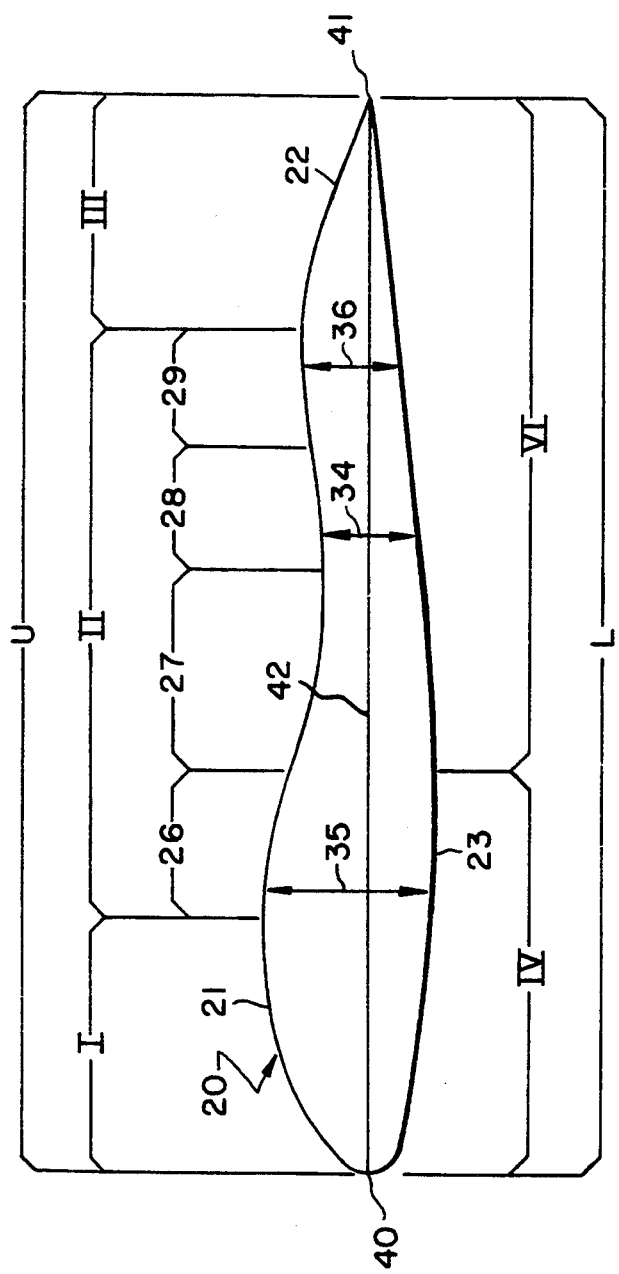
FIG. 1 is a chordwise cross section view of an airfoil section incorporating elements of the subject invention on the upper surface.

FIG. 1 illustrates a streamwise profile of an airfoil section 20 with leading edge 40, trailing edge 41 and chord line 42 extending from leading edge 40 to trailing edge 41, wherein upper surface U incorporates a forward-facing front slope I and a rear-facing rear slope III separated by a recessed central zone II comprised of slope segments 26,27,28,29 and containing a minimum thickness 34. These slope segments 26,27,28,29 are; rear-facing convex segment 26, rear-facing concave segment 27, forward-facing concave segment 28, and forward-facing convex segment 29. In combination, segments 26,27 and segments 28,29 comprise a rear-facing front slope 26-27 and a forward-facing rear slope 28-29. Airfoil 20 is an example of the subject invention including an upper surface U with two areas of major thickness 35,36, being the maximum thickness 35 and the second maximum thickness 36. This configuration of the upper surface U constitutes a bicambered surface of sinusoidal curvature.

The four separate slopes of upper surface U each comprise a pressure gradient with respect to fluid flow when freestream flow is reasonably parallel to chord line 42 and local flow is generally parallel to the surface. Forward-facing front slope I comprises a leading favorable pressure gradient. Rear-facing, front slope 26-27 comprises a forward adverse pressure gradient. Forward-facing, rear slope 28-29 comprises a rear favorable pressure gradient. Rear-facing, rear slope III comprises a final adverse pressure gradient.

Depending upon orientation of the airfoil 20 to flow direction, actual position of pressure gradients may change. For instance, at positive angles-of-attack part of slope I will act as an adverse pressure gradient being thereby positioned as a leeward slope with respect to free stream flow (for example refer to FIG. 5 through FIG. 7).

In combination, various of the preceding elements constitute raised ridges 21,22,23. An upper forward raised ridge 21 is formed by slope I and slope 26-27. An upper rear raised ridge 22 is formed by slope 28-29 and slope III.

The lower surface L is a single cambered surface and consists of a single outwardly convex section occupying the entire length of lower surface L and comprising, a favorable pressure gradient, forward-facing slope IV, and an adverse pressure gradient, rear-facing slope VI. Lower surface L comprises a single raised ridge 23.

Figure 2:
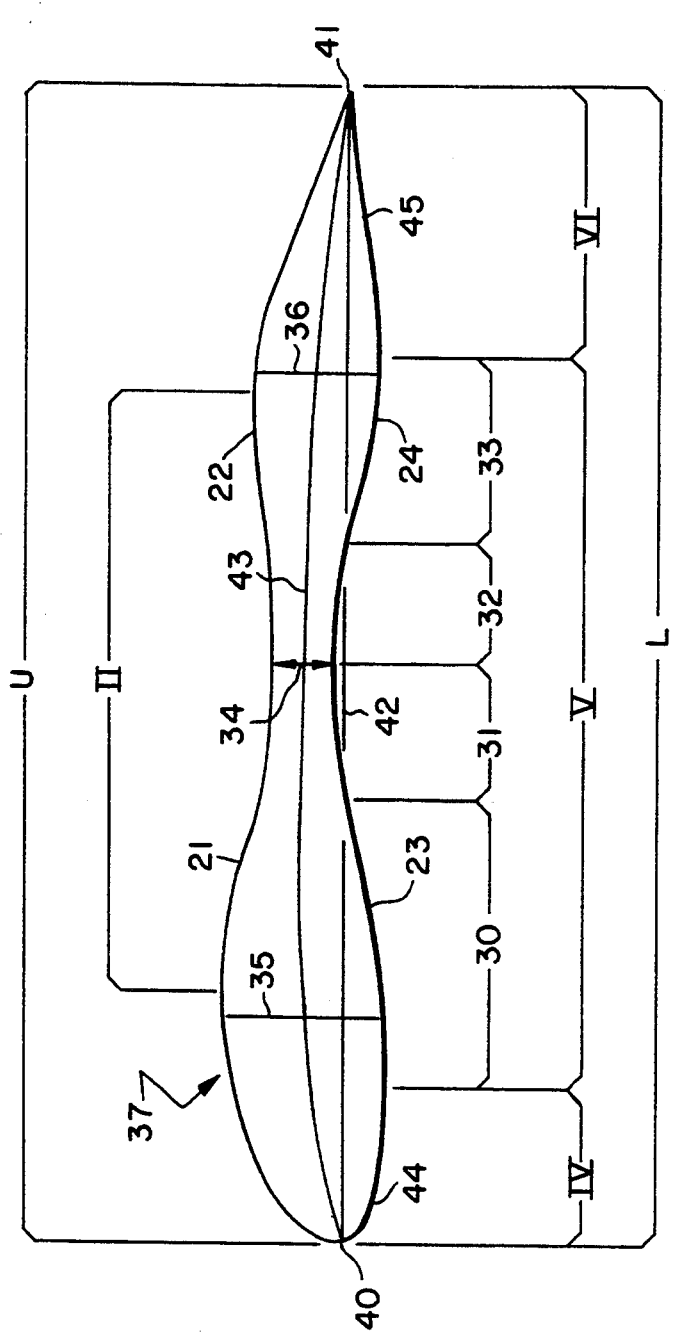
FIG. 2 is a chordwise cross section view of an airfoil section incorporating elements of the subject invention on both upper and lower surfaces.

FIG. 2 shows a streamwise cross section profile of a bicambered surface airfoil 37 incorporating raised ridge sections 21,22,23,24 on both upper surface U and lower surface L. The four separate slopes IV,30-31,32-33,VI of lower surface L each comprise a pressure gradient with respect to fluid flow when free stream flow is reasonably parallel to chord 42. Forward-facing front slope IV comprises a leading favorable pressure gradient. Rear-facing, front slope 30-31 comprises a forward adverse pressure gradient. Forward-facing, rear slope 32-33 comprises a rear favorable pressure gradient. Rear-facing, rear slope VI comprises a final adverse pressure gradient.

Depending upon orientation of the airfoil 37 to flow direction, actual position of lower surface pressure gradients may change. For instance, at positive angles-of-attack part or all of slopes IV,30-31,32-33,VI will act as a favorable pressure gradient being thereby positioned as a windward slope with respect to free stream flow (for example refer to FIG. 5 and FIG. 7).

FIG. 2 is an example of an embodiment of a bicambered airfoil 37 incorporating a reflexed mean geometric chord line 43. Additional features illustrated in FIG. 2 that may be used with bicambered surface airfoils are a drooped nose 44, and a concave trailing edge surface 45. As configured, airfoil 37 of FIG. 2 would be suitable for low-speed, high-lift wings for light aircraft.

Likelihood of fluid separation increases with increase in gradient and length of the slope along which flow travels. By increasing the number of slopes on a given surface while keeping slope gradient the same, each individual slope becomes shorter and likelihood of separation is decreased. In FIG. 1, Compare the much shorter lengths of adverse pressure gradients 26-27,III on surface U versus the single long adverse pressure gradient VI on surface L. Airfoil 20 would resist separation on its upper surface U at positive attack angles much better than would lower surface L at negative attack angles because final adverse pressure gradient slope III is much shorter than slope VI.

Reducing or increasing height of each ridge 21,22,23 to reduce or increase slope gradient is possible to vary the effects of pressure gradients and to modify flow behavior.

As can be appreciated by reference to FIG. 1 and FIG. 2, a salient feature of bicambered surface airfoils, whether one or both surfaces U,L is bicambered, is presence of two points or areas of maximum thickness 35,36 separated by a substantial area of lesser airfoil thickness generally comprising upper recessed central zone II and lower recessed central zone V wherein the minimum thickness 34 is located. In FIG. 2 thickness 34 is substantially less than thicknesses 35,36. In FIG. 1, minimum thickness 34 is nearly equal in length to second maximum thickness 36. It is possible to have bicamber on one surface with no minimum thickness existing between ridge apexes, or to have an airfoil bicambered on both surfaces U,L wherein the thinnest point is equal to the lesser of maximum thicknesses 35,36; however certain flow benefits intended by the invention would be substantially reduced with such a configuration. Therefore, a minimum thickness 34 with length being less than length of the lesser of maximum thicknesses 35,36 is intended. In most instances thickness 34 would not exceed 80% of the lesser of thicknesses 35,36.

Being of asymmetrical design, airfoil 20 has forward maximum thickness 35 and rear second maximum thickness 36 that do not coincide with the apexes of ridges 21,22,23 but fall between them at points where upper surface U and lower surface L are parallel. Correspondingly, airfoil 37 has maximum thickness 35 and second maximum thickness 36 that do not coincide with the apexes of ridges 21,22,23,24 but lie at some point along the chord line 42 between them where upper ridges 21,22 are parallel to their corresponding lower ridges 23,24.

Although all drawing figures shown have their greatest maximum thickness 35 upstream of a lesser second maximum thickness 36, toward leading edge 40, it is possible to have airfoils wherein this order is reversed, having greatest maximum thickness 35 nearer trailing edge 41 as in applications that call for extremely stable airfoil with negative pitching moment about the 25% chord location.

Flow comparisons are made in FIG. 3 through FIG. 7 by illustrating flow characteristics over a prior art airfoil 39 and a bicambered surface airfoil 38 at varying angles-of-attack. Laminar flow is illustrated by a clean surface. Turbulent flow is illustrated by a line generally parallel to the surface. Separated flow is illustrated by irregular and random curved lines drawn between the surface and a line divergent from parallel to the surface.

In FIG. 3 through FIG. 7, all flows are presumed to be of equal and high enough velocity to achieve local critical Reynolds number on the shortest favorable pressure gradient at a point before reaching laminar separation point. This ensures that flow becomes turbulent before laminar separation and can continue attached on at least part of the downstream adverse pressure gradient.

Figure 3:
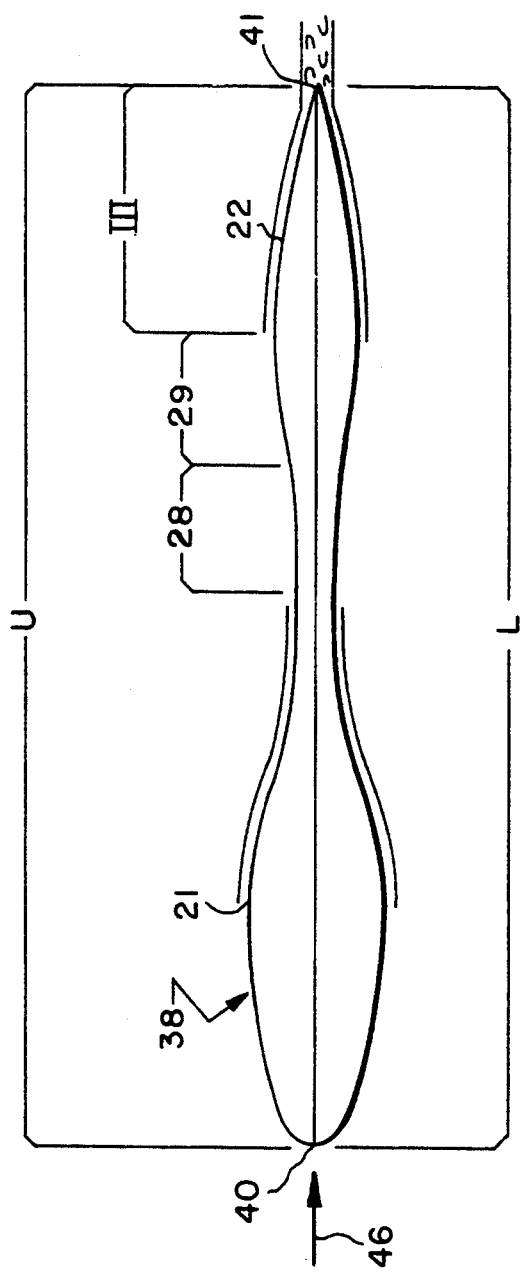
FIG. 3 is a chordwise cross section view of an airfoil section incorporating elements of the subject invention with illustration of flow over upper and lower surfaces at a presumed angle of attack of 0°.

Considering a flow depicted in FIG. 3 by arrow 46 at angle-of-attack=0° along airfoil 38, flow along the upper surface U from the leading edge 40 stagnation point will remain laminar until it reaches a point upstream of the apex of ridge 21. From this point flow experiences transition, becomes turbulent and remains turbulent until reaching the slope 28-29. Here, the favorable pressure gradient induces reverse transition which relaminarizes flow. Flow remains laminar until reaching a point near the apex of ridge 22 where it becomes turbulent, flows along the rear adverse pressure gradient of slope III until separating at a point very close to the trailing edge 41.

Because airfoil 38 is symmetrical, flow along lower surface L at angle-of-attack=0° is similar to flow along upper surface U.

Figure 4:
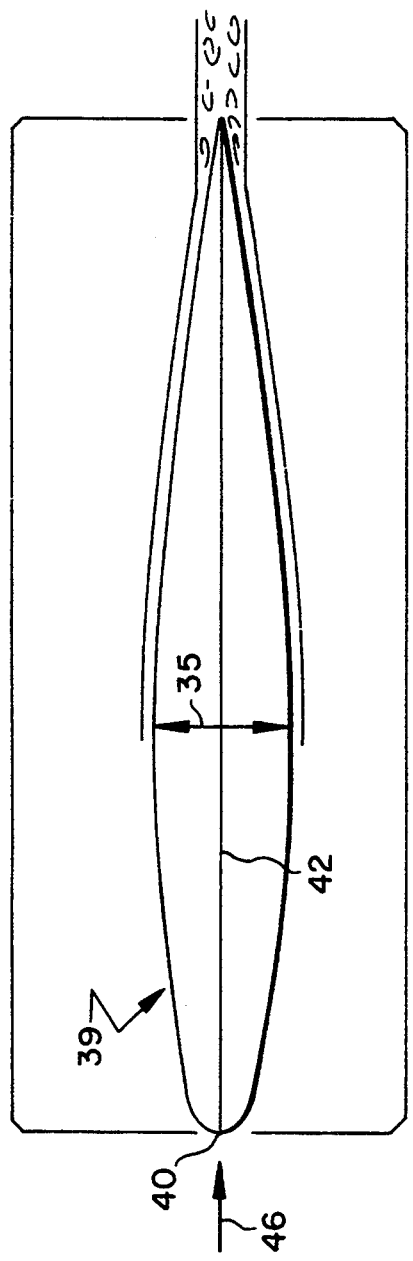
FIG. 4 is a chordwise cross section view of a prior art airfoil section with illustration of flow over upper and lower surfaces at a presumed angle of attack of 0°.

Flow over airfoil 39 at angle-of-attack=0° is depicted in FIG. 4. Flow along surface U is laminar from the leading edge 40 stagnation point to a point forward of the maximum thickness 35. Here, flow becomes turbulent until it separates at approximately the 90% to 95% chord position.

Because airfoil 39 is symmetrical, flow over lower surface L at angle-of-attack=0° is similar to flow over upper surface U.

Comparing FIG. 3 and FIG. 4, laminar flow on each surface of airfoil 39 occupies a single length portion of chord 42 which is somewhat less than the total of the two separate lengths of laminar flow on each surface of airfoil 38. The single length of turbulent flow on airfoil 39 is the same as the total of the two lengths of turbulent flow on airfoil 38. The length of wake separation is greater on airfoil 39. Airfoil 38 therefore has lower pressure drag due to shorter area of separated wake flow and lower profile drag (skin-friction) due to longer laminar flow area. Overall, airfoil 38 experiences less drag. Refer to Table 1 below for a summary comparison of flows.

Being of symmetrical design, both airfoils 38,39 experience zero lift at angle-of-attack=0°.

Figure 5:
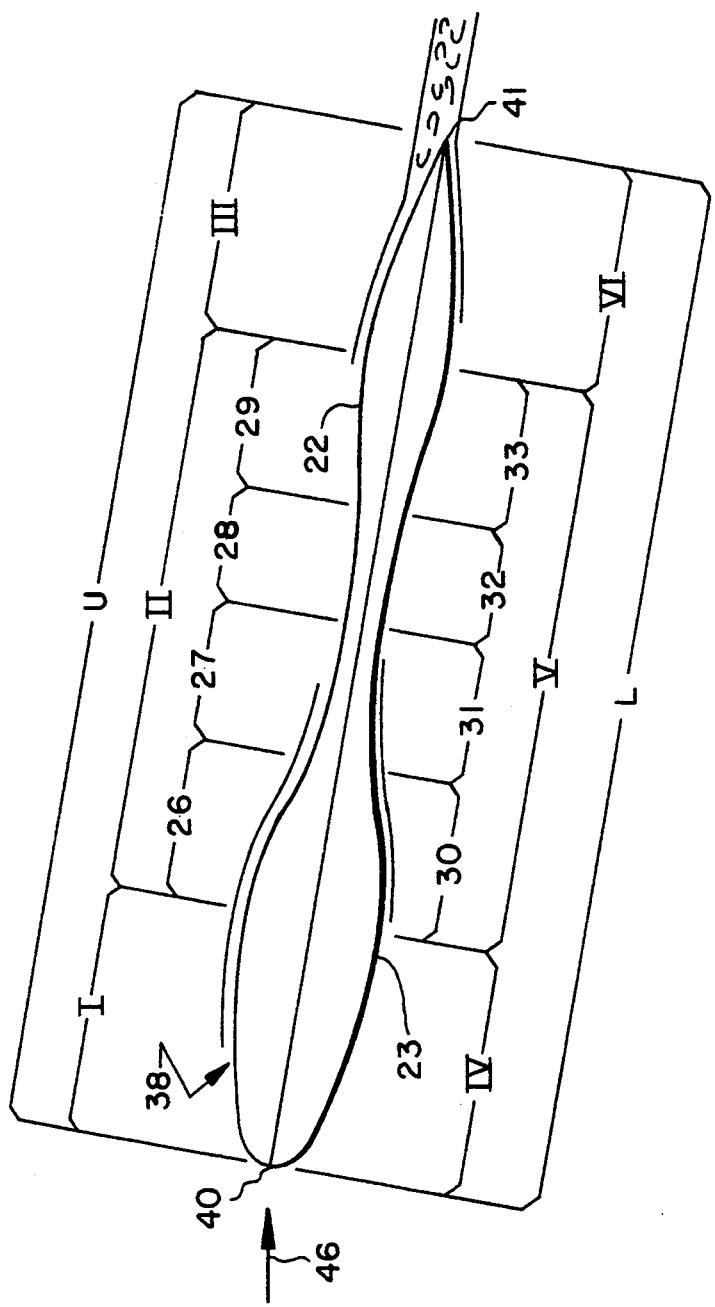
FIG. 5 is a chordwise cross section view of an airfoil section incorporating elements of the subject invention with illustration of flow over upper and lower surfaces at a presumed angle of attack of 10°.

Referring now to FIG. 5, flow is at an angle-of-attack=10° depicted by arrow 46. Flow along the upper surface U from leading edge 40 stagnation point remains laminar until it reaches a point on slope I which is tangent to freestream flow. At this point flow becomes turbulent until reaching the favorable pressure gradient formed within zone II by slope segment 27. Relaminarization is promoted by the continuing concave surface of slope segment 28. Flow remains laminar until reaching a point just forward of the apex of ridge 22. Effectively, flow has been redirected from its mainstream direction shown by arrow 46 to a new direction determined by relaminarization occurring in zone II. Turbulent flow remains attached on the final adverse pressure gradient of slope III until separating in a turbulent wake very close to the trailing edge 41.

Flow along lower surface L is laminar from the leading edge 40 stagnation point until it reaches slope segment 30 of ridge 23 tangent to freestream flow where transition occurs. Concave slope segment 31 and the favorable pressure gradient on slope 32-33 relaminarize flow to a point virtually at the trailing edge 41.

Figure 6:
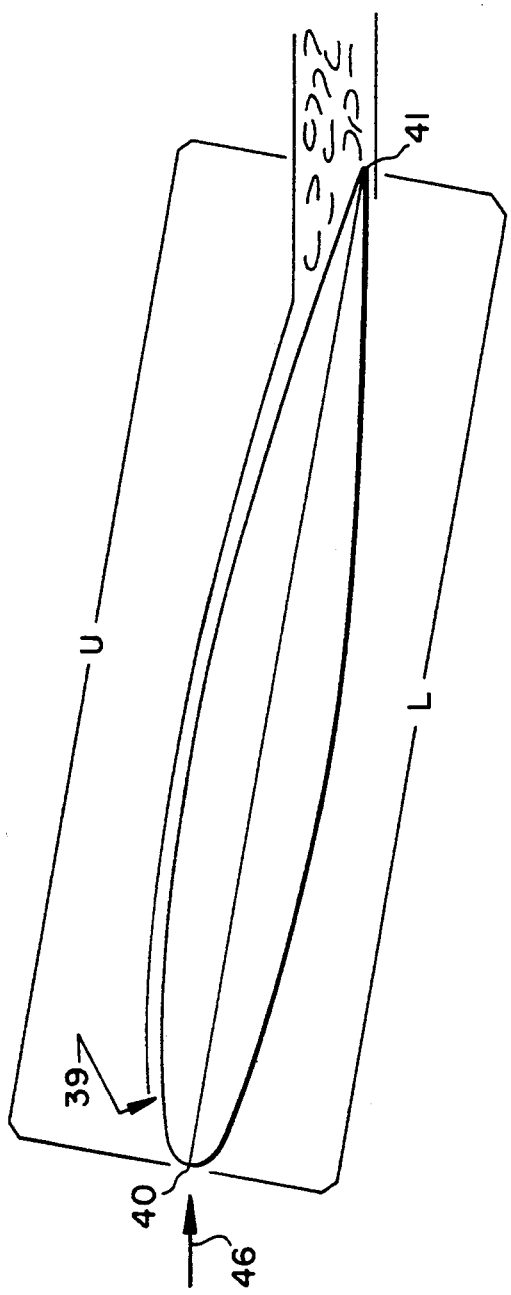
FIG. 6 is a chordwise cross section view of a prior art airfoil section with illustration of flow over upper and lower surfaces at a presumed angle of attack of 10°.

Flow over airfoil 39 at angle-of-attack=10° is depicted in FIG. 6. Flow along upper surface U is laminar from the leading edge 40 stagnation point to a point tangent to freestream flow. Here, flow becomes turbulent and remains turbulent until separating in a turbulent wake ahead of the trailing edge 41.

Flow along lower surface L is laminar from the leading edge 40 stagnation point until it reaches a point tangent to freestream flow where it becomes turbulent, remaining turbulent to a point very near the trailing edge 41.

Comparing flow in FIG. 5 and FIG. 6, it will become apparent that laminar flow over surfaces of airfoil 39 occupies an equal or slightly lesser part of total surface U,L than on airfoil 38. Total length of turbulent flow is greater on airfoil 38. Trailing edge separated wake on airfoil 39 is appreciably greater than on airfoil 38.

Airfoil 38 has lower pressure drag due to shorter length of trailing edge separated wake flow. It has higher profile drag (skin-friction drag) due to longer area of turbulent flow. Overall, airfoil 38 experiences less drag; the gain being due to reduction of separated wake flow drag more than offseting the increase in turbulent flow profile drag. Refer to Table 1 below for a summary comparison of the characteristic flows.

Lift coefficient for airfoil 38 is greater than for airfoil 39 because of smaller separated wake, 4% of chord length compared to 7% (see Table 1 below) and due to increased pressure on slope 32-33.

Figure 7:
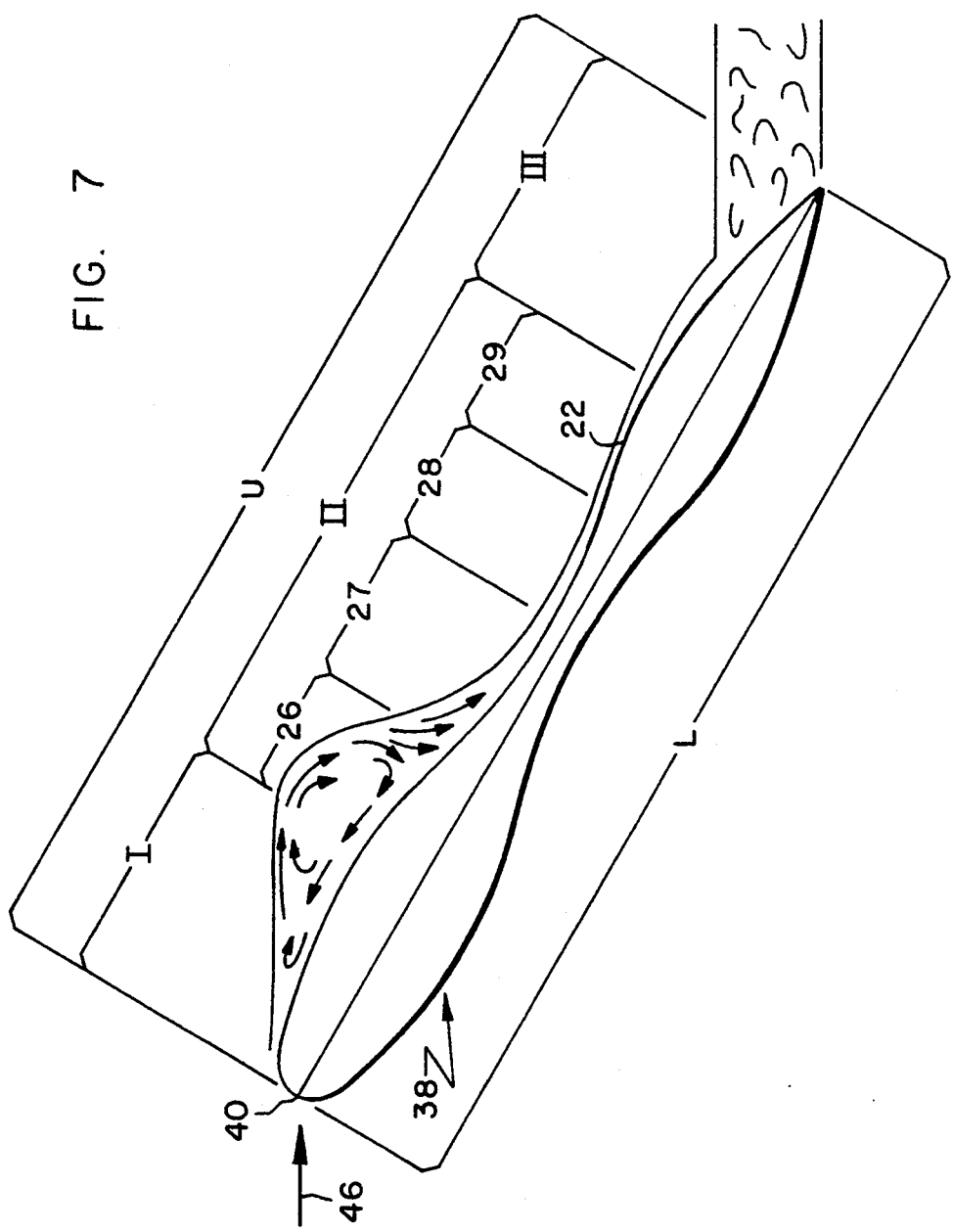
FIG. 7 is a chordwise cross section view of an airfoil section incorporating elements of the subject invention with illustration of flow over upper and lower surfaces at a presumed angle of attack of 30°.

FIG. 7 shows flow at angle-of-attack=30° for airfoil 38. A large encapsulated separation bubble occurs on upper surface U beginning on slope I. Reattachment occurs downstream.

With single cambered airfoils, reattachment of leading edge separated flow is normal in dynamic stall situations wherein an airfoil is rapidly pitched to a high angle-of-attack. The reattachment behavior is short lived and static stall, which is a rapid bursting of the separation bubble as it joins the separated wake, immediately follows.

With bicambered surface U, an airfoil 38 is able to perpetuate reattachment by the presence of recessed central zone II. The actual process by which this is accomplished is not fully understood. Lacking empirical data for analysis, the following theory is presented:

The separated bubble rotates in a clockwise direction, wherein flow on the airfoil surface U is reversed. This reversed flow encounters what is now a favorable pressure gradient, segment 26, which tends to accelerate flow and increase reverse circulation. The accelerated clockwise circulation creates a Magnus effect on the laminar upper stream flow, tending to pull it back toward the surface.

Reattachment has the effect of redirecting flow such that trailing edge separation remains relatively far back on slope III. The separated wake on slope III is prevented from moving forward by the intervention of ridge 22, thus movement of wake separation forward is prevented allowing lift to be maintained at extreme angles not possible for single cambered airfoils.

An encapsulated separation bubble produces some lift while extracting minimal drag penalty, unlike trailing edge separated wake, which produces no lift and very high drag. Development of an encapsulated separated bubble is presumed to begin at, or shortly beyond angles-of-attack where maximum lift coefficients are experienced, starting as a short bubble, growing in length and height with increasing angle-of-attack, thereby progressively diminishing lift coefficents and increasing drag coefficients as angle-of-attack increases.

TABLE 1

| | Characteristic Flow Proportion as a % of Chord Length | | | | |
|---|---|---|---|---|---|
| | Angle of Attack | Laminar | Turbulent | Encapsulated Bubble | Wake Flow |
| | | Bicambered | | | |
| FIG. 3 | 0° | 43% | 55% | 0% | 2% |
| FIG. 5 | 10 | 52 | 44 | 0 | 4 |
| FIG. 7 | 30 | 51 | 22 | 21 | 6 |
| | | Prior Art | | | |
| FIG. 4 | 0° | 38% | 55% | 0% | 7% |
| FIG. 6 | 10 | 53 | 40 | 0 | 7 |

Figure 8:
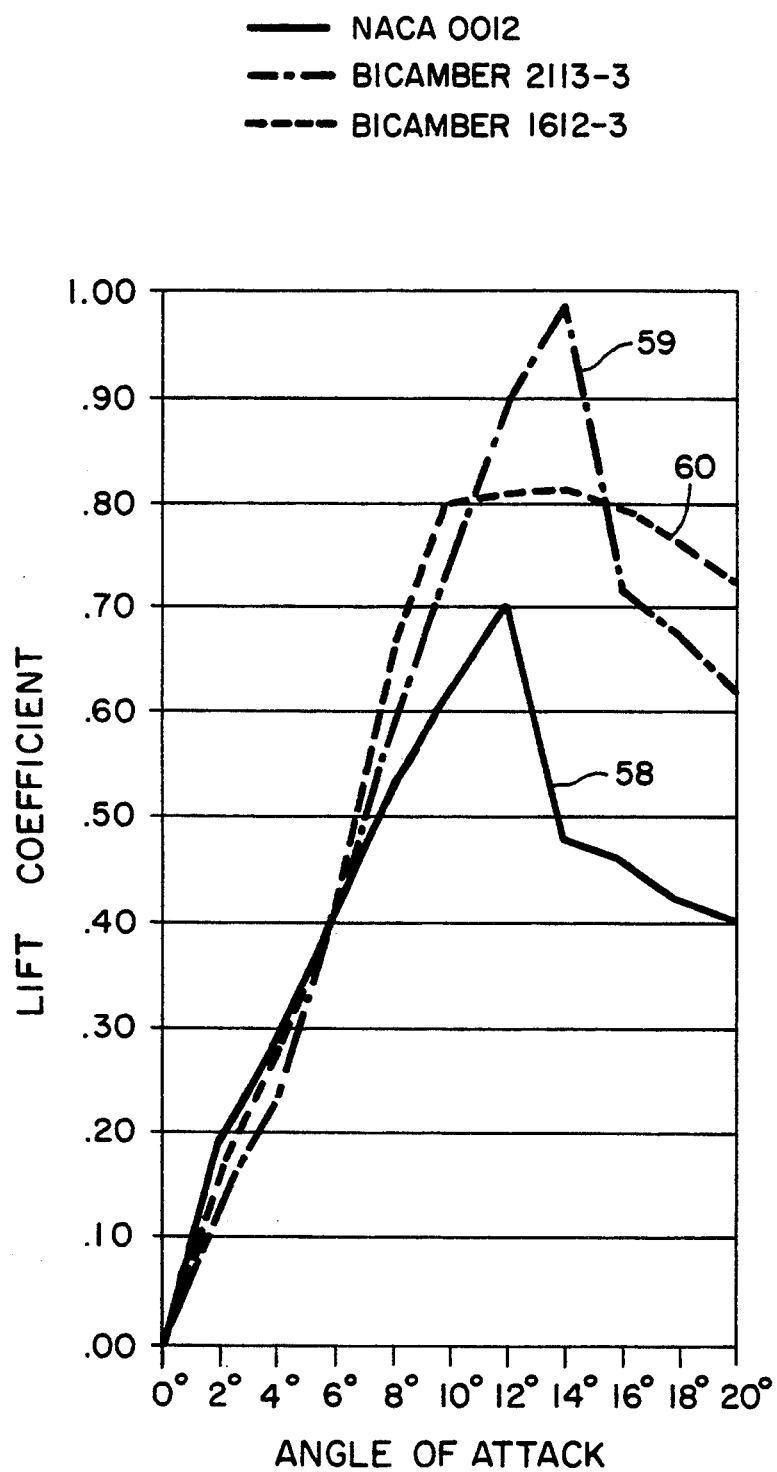
FIG. 8 is a graphical representation of change in lift coefficient to change in angle-of-attack curve for a NACA 0012 airfoil and two airfoils of the subject invention.

A major difference between bicambered surface airfoils and prior art airfoils is configuration of the curve of lift coefficient to angle-of-attack. FIG. 8 is a graph of lift coefficient $C_L$ to angle-of-attack for a prior art NACA 0012 airfoil, curve line 58, a bicambered airfoil, numbered 2113-3, curve line 59, and a bicambered airfoil, numbered 1612-3, curve line 60. Dimensions of these two airfoils are as follows:

TABLE 2

| Dimensions of bicambered airfoils tested, expressed as a percent of chord length | | | | | |
|---|---|---|---|---|---|
| | Thickness | | | Distance from Leading Edge | |
| Airfoil Designation | Minimum | Maximum | | Forward | Rear |
| | | Forward | Rear | | |
| 2113-3 | 7% | 13% | 10.7% | 20.8% | 79.2% |
| 1612-3 | 3.9% | 11.7% | 9.4% | 16.1% | 83.9% |

All three airfoils were tested under similar conditions in a 12″ test section wind tunnel at 60 ft./second. Blockage effects of the tunnel cause curve 58 to show continued lift at angles above the 12°–13° stall angle of the NACA 0012. Despite this limitation the curves are comparable and display relative performance of bicambered airfoils vs a prior art airfoil. Evident from FIG. 8 is a steepening of curves 59,60 at 6° which is the crossover point where the bicambered airfoils produce higher lift coefficients. Substantially higher maximum lift coefficients are obtained at higher angles of attack. Curve 58 of the NACA 0012 shows stall at 12°. Airfoil 2113-3 evidences stall at 14° although still producing lift beyond 14° in excess of maximum lift coefficient of 0.7 attained by the NACA 0012 airfoil. Curve 60 for airfoil 1612-3 shows no evidence of stall, lift declining gradually beyond 12° and maintaining very high lift coefficient even at 20°.

Figure 9:
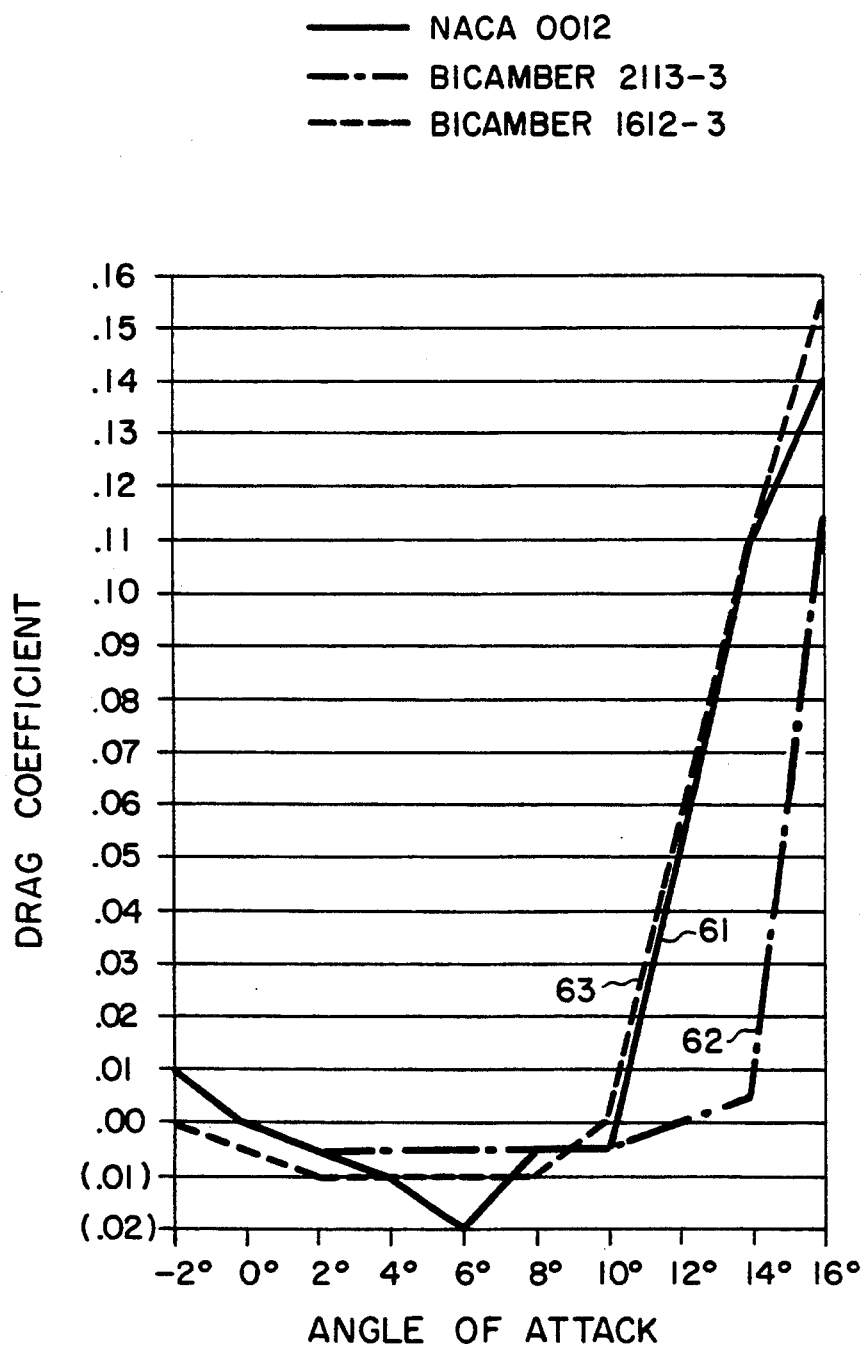
FIG. 9 is a graphical representation of change in drag coefficient to change in angle-of-attack curve for a NACA 0012 airfoil and two airfoils of the subject invention.

Drag coefficients for these same three airfoils are illustrated in FIG. 9. Here also, blockage effects in the 12″ test section wind tunnel and possible calibration inaccuracies are responsible for negative drag values at low angles-of-attack and appearance of low drag bucket on the NACA 0012, curve 61, at 6° angle-of-attack rather than 0°. Though not accurate, the results, having been obtained under similar test conditions, are comparable between the three airfoils and show very favorable drag coefficients. Of principal note, curve 62 for airfoil 2113-3 has very low drag at angles-of-attack up to 14°. No apparent drag bucket appears on either bicambered airfoil curve 62,63. However airfoil 1612-3, curve 63 has drag equally as low (except within the narrow drag bucket) as the NACA 0012, curve 61.

Figure 10:
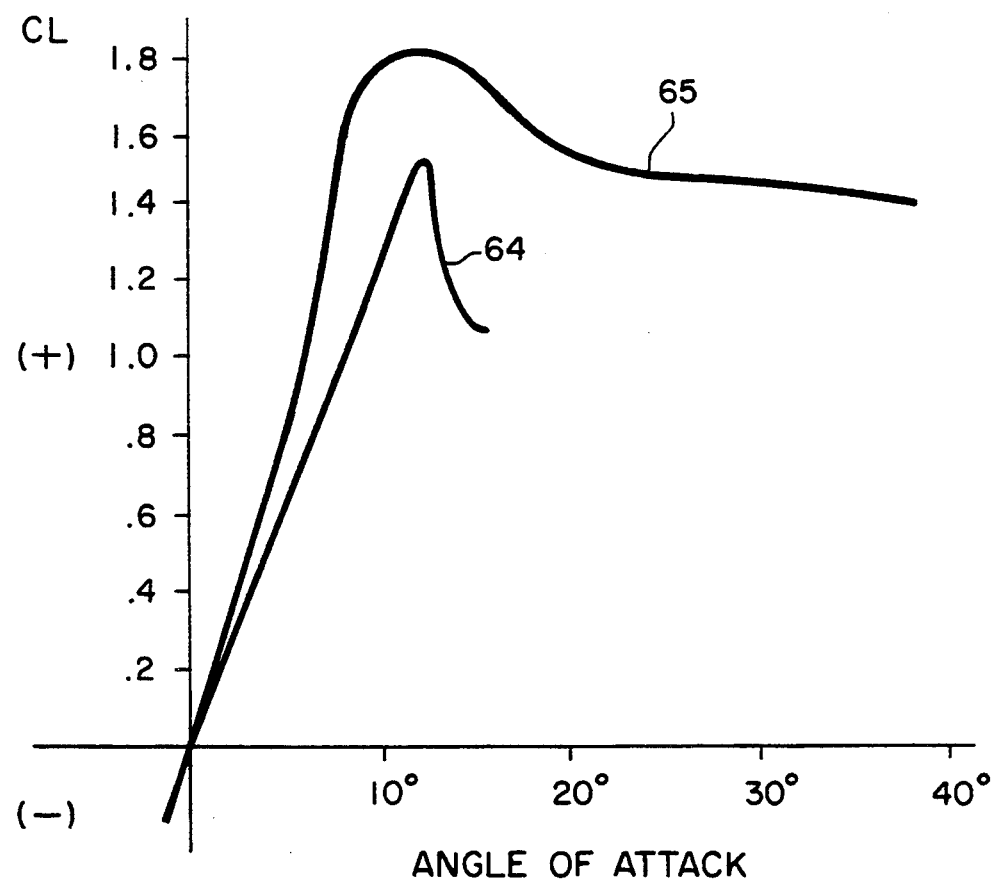
FIG. 10 is a graphical representation of change in lift coefficient to change in angle-of-attack curve for a prior art NACA $63_1012$ airfoil and predicted change in lift coefficient to change in angle-of-attack for a comparable airfoil of the subject invention.

Based upon the test results shown in FIG. 8 and FIG. 9 and analysis predicting flow over surfaces of bicambered airfoils at higher Reynolds number, FIG. 10 is a graph of predicted lift coefficient for a 12% bicambered airfoil, curve line 65 compared to actual Lift Coefficient for a NACA $63_1012$ airfoil, curve line 64 (Source, NACA Technical Note 2502). At small positive angles, development of lift is similar for both airfoils. At approximately 6° angle-of-attack curve line 65 increases in steepness rising to attain higher lift coefficent at given angles-of-attack than curve 64. The bicambered airfoil curve 65 also attains higher maximum lift coefficient and maintains lift at higher angle-of-attack than the prior art airfoil curve 64. These effects are possible because more of upper surface U is covered by attached flow at any given angle, and dynamic pressure on the rear favorable pressure gradient of slope segments 32,33 of lower surface L give the effect of a cambered airfoil; i.e. very high lift coefficient. As angle-of-attack increases, lift gained from increasing dynamic pressure is in part offset by formation of encapsulated short bubble separation and some growth of trailing edge separated wake on the negative pressure upper surface U. The lift curve 65 is more nearly vertical at angles from 6° to about 8° which is the approximate point where maximum lift/drag ratio occurs. There is a dip in curve 65 at 14°–20°, being the angle at which separation bubble first forms. Maximum lift occurs in the range of 12°–14°. Beyond maximum lift and formation of encapsulated separation bubble, curve 65 levels off, then continues nearly horizontal, near maximum, declining gradually at angles in excess of 20°.

Figure 11:
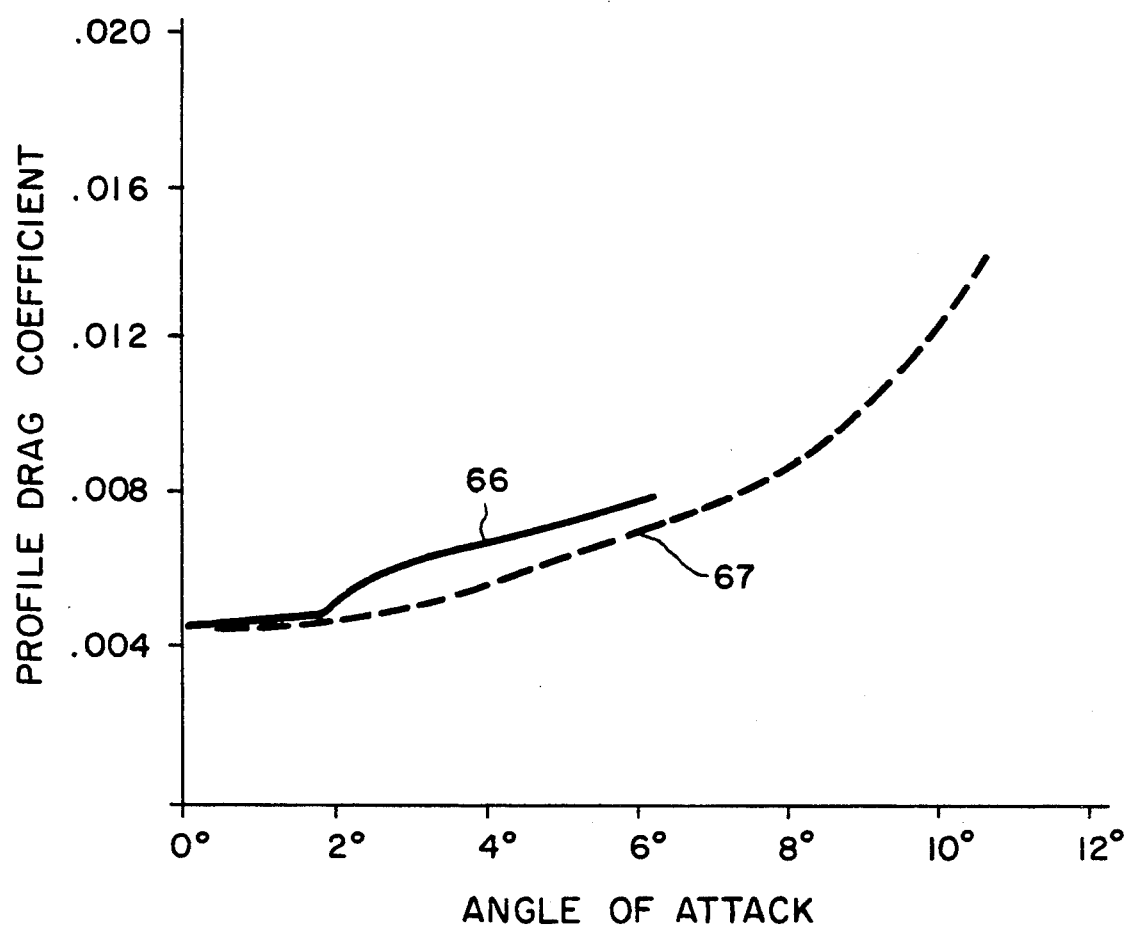
FIG. 11 is a graphical representation of change in drag coefficient to change in angle-of-attack curve for a prior art NACA $63_1012$ airfoil and predicted change in drag coefficient to change in angle-of-attack for a comparable airfoil of the subject invention.

Based upon test results shown in FIG. 8 and FIG. 9 and analysis predicting flow over surfaces of bicambered airfoils at higher Reynolds number, FIG. 11 illustrates a graph of predicted Profile-Drag coefficient to Angle-of-Attack for an assumed bicambered surface airfoil, disjunct curve line 67, compared to actual data, solid curve line 66, for a NACA $63_1012$ airfoil, (Source, NACA Technical Note 2502). Curve 67 exhibits equal or lower drag at very low angles-of-attack, a wider less pronounced drag bucket, and substantially lower drag beyond the drag bucket of curve 66 due to shorter area of separated wake flow.

Figure 12:
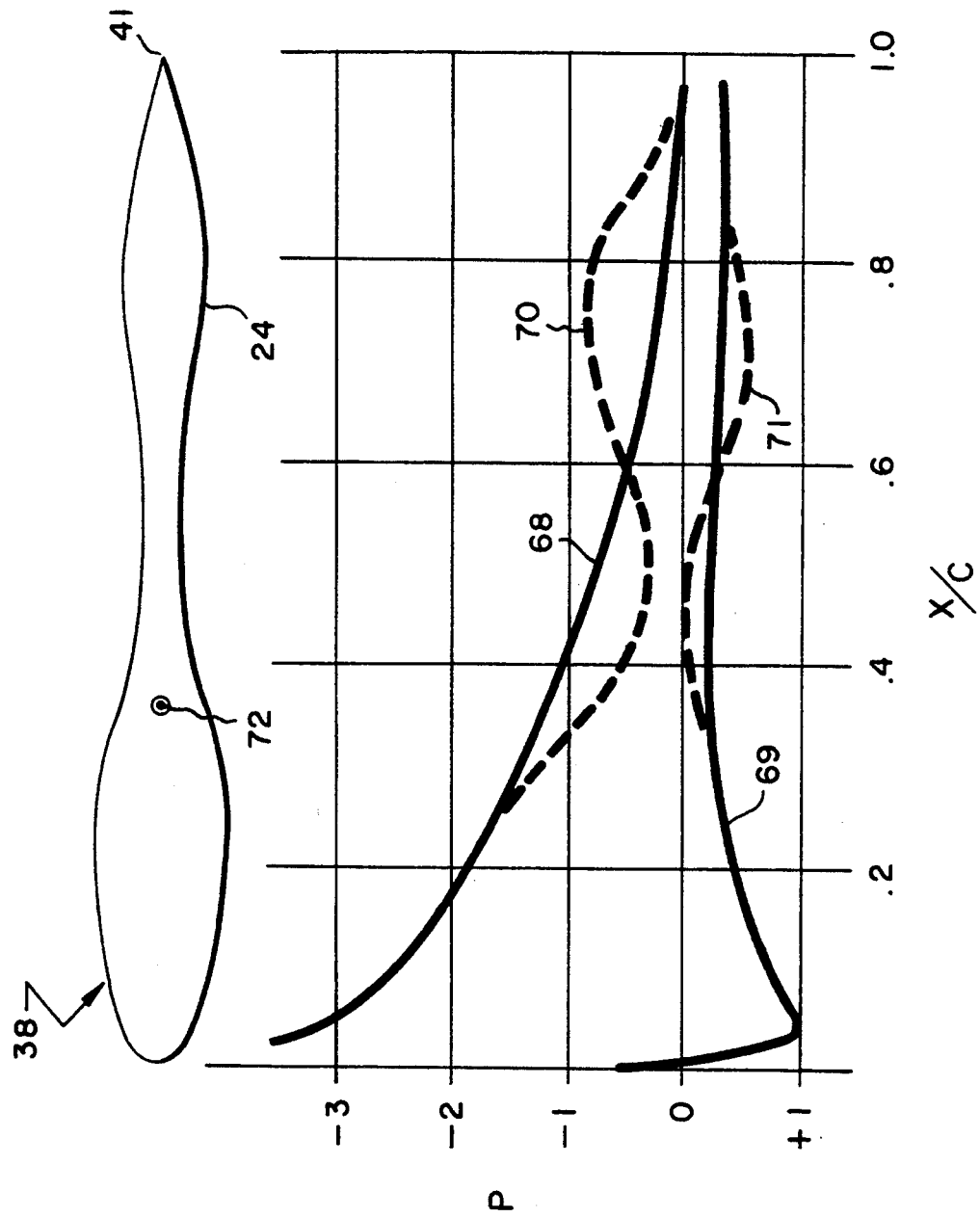
FIG. 12 is a graphical representation of pressure coefficient for a prior art NACA $63_1012$ airfoil at 9.8° angle-of-attack and predicted pressure coefficient for a comparable airfoil of the subject invention at 10° angle-of-attack.

Empirical pressure measurements have not been made on a bicambered airfoil. FIG. 12 and the following comparison are based upon predicted flow behavior, its predicted affect on pressure, plus analysis of lift and drag curve measurements from empirical lift and drag experiments, the results of which are presented above and in FIG. 8 and FIG. 9.

The vertical axis of FIG. 12 is a measure of local static pressure less free stream static pressure divided by dynamic pressure, giving a pressure coefficient, P. The horizontal axis plots the ratio of local chord position to total chord length, x/c. The solid curve lines 68,69 plot local pressure coefficient on negative pressure upper surface 68 and on positive pressure lower surface 69 of a prior art NACA $63_1012$ airfoil at 9.8° angle of attack, (Source, NACA Technical Note 2502). The disjunct curve lines 70,71 plot assumed respective values for airfoil 38 pictured above the graph. At the 0.23 chord location negative pressure on the upper surface, curve 70 falls as the forward adverse pressure gradient is encountered. Negative pressure coefficient, curve 70 rises at the 0.5 chord position where flow again accelerates and relaminarizes, thereby sustaining greater negative pressure, curve 70 on the rear raised ridge surface from chord location 0.6 to very near the trailing edge than on the prior art airfoil, curve 68.

The positive pressure coefficient on the lower surface, curve 71 decreases as flow enters the recessed central zone between the 0.2 and 0.4 chord position. Pressure on the lower rear raised ridge 24 is greater than on the prior art airfoil from 0.6 to 0.8 chord position due to its greater angle of orientation toward flow. From the graph it will become apparent that lift on the central portion from chord location 0.23 to 0.6 is less on the bicambered airfoil than on the prior art airfoil and greater from chord location 0.6 to 0.97.

It will be seen from the comparison that airfoil 38 will have an aerodynamic center 72 that is farther aft than that of the NACA $63_1012$. This is possible because of the following five factors; i) reduced lift on the negative pressure surface caused by the adverse pressure gradient occuring in front of mid-chord position, ii) reduced pressure on the positive pressure surface at the central chord area caused by the adverse pressure gradient occuring in front of mid-chord position, iii) increase in lift on the positive pressure surface caused by higher pressure on the aft forward facing slope concentrated behind the mid-chord position, iv) reduced pressure on the negative pressure surface caused by the favorable pressure gradient behind midchord, v) reduced trailing edge separation provides greater negative pressure lift concentrated at the rear of the airfoil. The combined effect of these changes is to produce a negative direction moment about the 25% chord location. Hence the aerodynamic center 65 is located aft of the 30% chord location. Depending on height of ridges, configuration of slopes, etc., it is possible to locate the aerodynamic center very close to chord mid point.

Alternative Embodiments

Among other alternatives, variations of bicambered surface airfoils are possible wherein thickness in the forward part is less than thickness in the rear part, areas of curvature may be separated by intervening planar areas, sharp leading edges, droop noses and outwardly convex trailing edge sections can be included to modify aerodynamic qualities. Variable height raised ridges can be incorporated to give optimum dynamic characteristics at different fluid velocities and viscosities for a single airfoil.

Heights of raised ridges relative to both chord length and from one raised ridge to the other, depth of recessed central zones, radius characteristics of the slope curves, and distance between raised ridges can be infinitely varied to tailor design to velocity, viscosity and density of the fluid element, and to airfoil loading of the airfoil. As a general rule, with increased design velocity ridges become less prominent and have lesser angled ridge slopes. With increased design maneuverability and anti-stall qualities ridges become more prominent with greater angled slopes.

Figure 13:
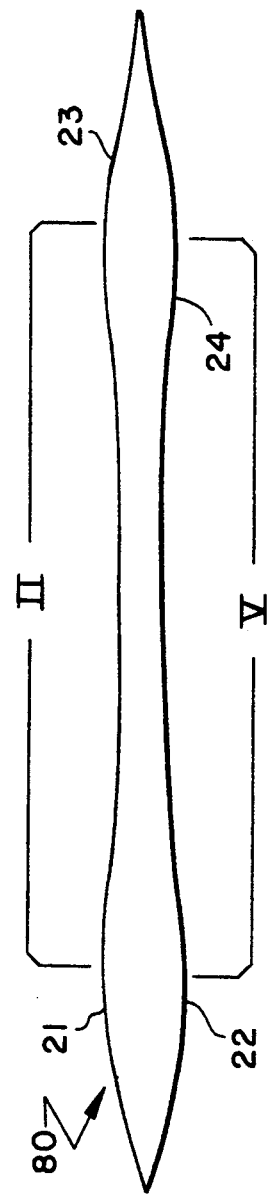
FIG. 13 is a chordwise cross section view of an airfoil section intended for hypersonic flight incorporating elements of the subject invention.
Figure 14:
FIG. 14 is a chordwise cross section view of an airfoil section intended for hypersonic or high subsonic, radar evasion flight, incorporating elements of the subject invention.

FIG. 13 and FIG. 14 are examples of alternative embodiments of bicambered airfoils. FIG. 13 is a streamwise cross section profile of a bicambered airfoil 80 intended for supersonic application, having elongated, less prominent ridges 21,22,23,24 and recessed central zones II,V that incorporate long planar sections. Bicambered surfaces' ability to resist flow separation allows use of extremely thin airfoil sections for producing improved lift at high angles-of-attack such as would be desired for highly maneuverable hypersonic aircraft and for lower speed landings and take-off of hypersonic aircraft. FIG. 14 illustrates another hypersonic or high sub-sonic airfoil with raised ridges formed by planar surfaces to provide radar avoidance capabilities.

Alternative embodiments not shown in the attached drawings are possible without departing from the general concept and spirit of the invention.

What is claimed is:

1. An improved airfoil section having a significant span, a leading edge, a trailing edge, a chord comprising a straight line extending from said leading edge to said trailing edge, said section having a lower surface being bicambered in contour and constructed with alternating favorable pressure gradient means and adverse pressure gradient means, an upper surface being bicambered in contour and constructed with alternating favorable pressure gradient means and adverse pressure gradient means, and a profile thickness separating said upper surface and said lower surface.

2. An airfoil section in accordance with claim 1) wherein said profile comprises a maximum thickness, a second maximum thickness and a minimum thickness, said minimum thickness being not greater than 0.8 times the lesser of said maximum thickness and said second maximum thickness.

3. An airfoil section in accordance with claim 1) wherein said upper surface and said lower surface are further constructed and contoured to achieve a negative pitching moment coefficient about a point located at 25% of said chord and an aerodynamic center located behind 30% of said chord.

4. An airfoil section in accordance with claim 1) wherein said upper surface and said lower surface are further constructed and contoured to maintain high lift coefficient and delay stall to angles-of-attack in excess of 25°.

5. An airfoil section in accordance with claim 1) wherein said upper surface and said lower surface are further constructed and contoured to delay trailing edge flow separation such that aerodynamic drag is reduced.

6. An airfoil section in accordance with claim 1) wherein each of said upper and lower surfaces comprises a forward raised ridge and a rear raised ridge, each of said ridges comprising a forward-facing slope, an apex, and a rear-facing slope, said apexes separated by a predetermined distance of not less than 40% of said chord and enclosing a recessed central zone comprised of said rear-facing slope of said forward raised ridge and said forward-facing slope of said rear raised ridge, said apex of said forward raised ridge being located not more than 30% of said chord behind said leading edge, said apex of said rear raised ridge being located not less than 70% of said chord behind said leading edge.

7. An airfoil having a profile, a chord, a leading edge, a trailing edge, a significant span, means defining a lower surface, means defining an upper surface, said profile expanding in thickness from said leading edge to a maximum thickness located at a predetermined point in front of midpoint of said chord, thereafter contracting in thickness reaching a minimum thickness at a predetermined point along said chord, thereafter expanding in thickness to a second maximum thickness located at a predetermined point behind midpoint of said chord, thereafter contracting in thickness to said trailing edge where said surfaces conjoin, said means defining an upper surface being bicambered in contour and constructed with a forward raised ridge and a rear raised ridge comprising alternating favorable pressure gradient means and adverse pressure gradient means to produce substantially attached flow, reattachment of flow, relaminarization of flow and delay of trailing wake separation on said upper surface, said means defining a lower surface being bicambered in contour and constructed with a forward raised ridge and a rear raised ridge comprising alternating favorable pressure gradient means and adverse pressure gradient means to achieve increased pressure behind midpoint of said chord.

8. A stable, high efficiency, high angle-of-attack airfoil comprising a significant span, a leading edge, a trailing edge, means defining a bicambered upper surface, means defining a lower surface, a chord comprising a straight line extending from said leading edge to said trailing edge, said means defining upper and lower surfaces conjoined at said leading edge and at said trailing edge, a profile expanding in thickness from said leading edge to a maximum thickness located in front of midpoint of said chord, thereafter contracting in thickness reaching a minimum thickness at a predetermined point along said chord, thereafter expanding in thickness to a second maximum thickness located behind midpoint of said chord, thereafter contracting in thickness to said trailing edge where said surfaces conjoin, said means defining a lower surface being bicambered in contour and constructed with a forward raised ridge and a rear raised ridge comprising alternating favorable pressure gradient means and adverse pressure gradient means to achieve increased pressure behind midpoint of said chord.

* * * * *